April 15, 1969  B. E. WRENSCH  3,438,471
COMBINATION CLUTCH AND BRAKE
Filed Sept. 12, 1967
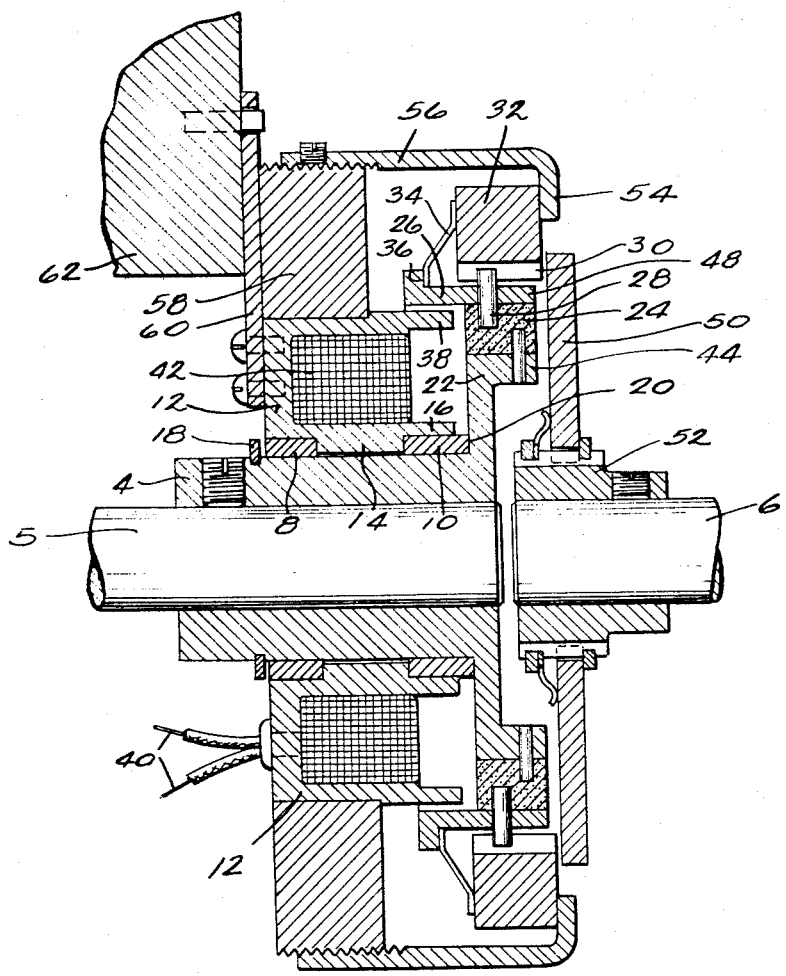
INVENTOR
BERNARD E. WRENSCH
BY Wheeler, Wheeler, House & Clemency
ATTORNEYS United States Patent Office 3,438,471
Patented Apr. 15, 1969

3,438,471
COMBINATION CLUTCH AND BRAKE
Bernard E. Wrensch, Brookfield, Wis., assignor to Stearns Electric Corporation, Milwaukee, Wis., a corporation of Wisconsin
Filed Sept. 12, 1967, Ser. No. 667,220
Int. Cl. F16d *11/06, 13/22, 67/02*
U.S. Cl. 192—18                                   7 Claims

ABSTRACT OF THE DISCLOSURE

A rotor having a hub rotatable within an annular electromagnet carries extension poles for the magnet and also supports a normally engaged brake ring which is so positioned as to be disengaged when an armature with a clutch surface engages the extension poles on the hub and forces the brake ring out of contact with the fixed brake surface normally engaged thereby.

Background of the invention

One of the objects of the invention is to provide an axially compact clutch and brake unit. Attention is invited to my companion application 481,788 on an Electromagnetically Controlled Clutch and Brake Organization, filed Aug. 23, 1965, and now Patent No. 3,337,013. In this companion application, there is disclosed a device having the same general operation but less compactly organized.

Summary of the invention

An electromagnet which is fixed against rotation has rotatable extension poles mounted on a carrier hub. This hub constitutes one of two rotors which are axially aligned and which, upon energization of the electromagnet winding, are clutched together.

The clutch action is effected by friction surfaces, one of which is provided on the hub and the other of which is provided on an armature attracted by extension polar member for which the hub serves as a carrier. The armature is mounted for axial advance and retraction. As it advances toward the hub, it engages a brake ring to displace it from braking engagement with the brake surface. The brake ring has a spring biasing it toward this surface. In its advance the ring transmits motion to the armature to displace it from engagement with the clutch surfaces. An annulus constituting a casing has a flange engaged by the brake ring and is adjustable to define the position of maximum advance of the brake ring respecting the hub.

Brief description of the drawing

The drawing shows a view in diametrical cross section through an embodiment of the present invention.

Description of preferred embodiment

For purposes hereof, the hub 4 and the shaft 6 constitute coaxial rotors which can be clutched together as hereinafter described. The hub 4 is mounted on a shaft 5. It has bearings at 8 and 10 on the inner periphery of the annular electromagnet frame 12. Between bearings 8 and 10 the frame extends to the hub at 14 to complete a flux path between the hub and the inner annular pole 16 of the magnet. Stop ring 18 and shoulder 20 fix the relative axial position of the magnet and the hub.

The generally radial portion 22 of the hub carriers an insert 24 of non-magnetic material, usually a molded friction material which is pressed into place and anchored between the portion 22 and the extension pole 26 by appropriate means such as the pins 28. The latter project from the extension pole 26 and are guided in channels 30 of the annular brake element 32 for accommodating axial movement of the brake element along the polar extension 26 subject to the axial bias of spring 34. The latter seats against the shoulder 36 on the polar extension 26. This polar extension laps the outer pole 38 of the electromagnet 12 to provide a flux path therefrom.

When the electromagnet is energized by supplying current from the lead 40 to its winding 42, the flux of poles 16, 38 is transmitted to the extension poles 44 and 48 to attract the armature 50 splined to the hub 52 on shaft 6. Engagement of this armature with the molded frictional material 24 and the end surfaces of the extension poles 44 and 48 clutches shaft 6 to hub 4.

The initial movement of the armature 50 to clutching position causes it to engage the braking annulus 32. Up to the time of such engagement, the ring 32 will be in braking contact with the annular flange 54 adjustably mounted by means of a threaded barrel or casing member 56 from the non-magnetic support 58. This annular casing encircles and encloses the magnet and is fixed to bracket 60 attached to the fixed member 62. Adjustment of the barrel 56 on the annular member 58 defines the position at which the braking ring 32 will engage flange 54 under the bias of the spring 34.

Thus, when the magnet is energized and armature 50 is attracted to the extension poles 44 and 48 carried by hub 4, the first effect is to disengage the brake which has held the hub 4 against rotation. The next effect is to clutch the hub to the shaft 6 so that these two rotors will operate as a unit. While the shaft 6 will normally be the driving rotor and the hub 4 will be the driven rotor, there are also circumstances in which the hub 4 may be the driving rotor as, for example, when it is mounted on the armature shaft of a motor and it is desired to maintain this shaft stationary whenever the motor is deenergized.

I claim:

1. A combination clutch and brake comprising a pair of substantially coaxial rotors one of which comprises a hub having radially spaced poles and provided with a clutch face, the other rotor having an armature axially movable thereon and provided with a clutch face complementary to the first-mentioned clutch face, means for electromagnetically energizing and deenergizing said poles, the energization of the poles attracting the armature and engaging said clutch faces, a brake ring encircling said poles and connected for rotation therewith and being axially slidable thereon, said brake ring having a friction surface at its end and normally disposed in an advanced position in which it projects beyond the first said clutch face, a spring biasing said brake ring to said advanced position, the armature having a radius exceeding that of the first said clutch face and being thereby adapted to engage the brake ring, the brake ring being yieldable against the bias of the spring to a retracted position when engaged by said armature, an annular brake member with which the end surface of the brake ring is frictionally engageable in the advanced position of the brake ring, and means providing a fixed mounting for said member.

2. A combination brake and clutch according to claim 1 in which said last means comprises a casing of which said member constitutes a flange.

3. A combination brake and clutch according to claim 2 in further combination with a support for said casing having threads with which complementary threads carried by the casing are in adjustable engagement.

4. A combination brake and clutch according to claim 2 in which the means providing a mounting for the casing includes a bracket and the means for electromagnetic energization of the poles comprises an electromagnet mounted on the bracket and having primary poles for which the poles first mentioned constitute extensions, the electromagnet being secured against rotation and the poles first mentioned being rotatable about the primary poles of the electromagnet.

5. A combination brake and clutch according to claim 1 in which the outermost of the first mentioned poles is provided with a shoulder constituting a seat engaged by the spring which biases the brake ring as aforesaid.

6. A combination clutch and brake comprising an annular electromagnet provided with a fixed supporting bracket and having inner and outer annular poles, a rotor operatively mounted for rotation within the inner pole of the electromagnet and provided with an annular inner pole which is an extension of the inner pole of the electromagnet, a non-magnetic ring encircling the said inner pole of the rotor, an outer extension pole comprising an annulus carried by said ring for rotation with the rotor, said outer pole lapping the outer pole of the electromagnet and constituting an extension thereof, the said rotor having a clutch surface at its end and bounded by the inner and outer surfaces of the extension poles, a second rotor coaxial with the first and having an armature provided with a friction clutch surface selectively engageable with the friction surface of the first rotor, said armature having floating connection with the second rotor and being movable between retracted and advanced position thereon, means normally holding the armature in its retracted position free of engagement with the first rotor, a brake ring mounted on the exterior of the first rotor and having a terminal friction braking surface, said ring being axially slidable between advanced and retracted positions, a complementary brake member, said ring being adapted in its advanced position to engage the brake member, means carried by the first rotor for biasing said ring to its said advanced position, and means including the armature for moving said ring free of said brake member when said armature is in its advanced position.

7. A clutch and brake according to claim 6 in which the brake member constitutes a flange and in further combination with a casing element on which the flange is mounted and which encircles the ring and the electromagnet and the first mentioned rotor, together with means for supporting said casing from said bracket.

References Cited

UNITED STATES PATENTS

| | | | |
|---|---|---|---|
| 2,432,272 | 12/1947 | Bariffi | 192—18.1 XR |
| 2,840,205 | 6/1958 | Linke | 192—18.2 |
| 2,954,859 | 10/1960 | Rabinow | 192—18.2 XR |
| 3,337,013 | 8/1967 | Wrensch | 192—18.2 |

CARLTON R. CROYLE, *Primary Examiner.*

ALLAN D. HERRMANN, *Assistant Examiner.*

U.S. Cl. X.R.

192—84; 188—163